(12) United States Patent
Koike et al.

(10) Patent No.: US 9,164,253 B2
(45) Date of Patent: Oct. 20, 2015

(54) COMPOSITE MOLDED LENS AND METHOD FOR PRODUCING THE SAME

(71) Applicant: FUJIFILM CORPORATION, Tokyo (JP)

(72) Inventors: Kazumi Koike, Saitama (JP); Seiichi Watanabe, Saitama (JP); Takayuki Fujiwara, Saitama (JP); Yasuhito Hiraki, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/459,371

(22) Filed: Aug. 14, 2014

(65) Prior Publication Data

US 2014/0347752 A1    Nov. 27, 2014

Related U.S. Application Data

(63) Continuation of application No. PCT/JP2012/080597, filed on Nov. 27, 2012.

(30) Foreign Application Priority Data

Mar. 8, 2012 (JP) ................. 2012-051227

(51) Int. Cl.
*G02B 7/02* (2006.01)
*G02B 27/10* (2006.01)
(Continued)

(52) U.S. Cl.
CPC .............. *G02B 7/02* (2013.01); *B29C 43/021* (2013.01); *B29C 45/14311* (2013.01);
(Continued)

(58) Field of Classification Search
CPC ........ G02B 7/02; G02B 7/021; G02B 25/002; G02B 27/145; G02B 3/0056; G02B 3/0062; G02B 5/045; G03B 21/56; G03B 21/625; G03B 21/602; B29L 2011/0016; B29D 11/0073
USPC ......... 359/819, 618–622, 626, 443, 454–455, 359/625, 808, 811; 264/1.1, 2.7, 1.32
See application file for complete search history.

(56) References Cited

U.S. PATENT DOCUMENTS

| | | | |
|---|---|---|---|
| 6,242,065 B1 * | 6/2001 | Blomberg et al. | 428/64.1 |
| 2006/0284327 A1 | 12/2006 | Yamamichi | |
| 2009/0296239 A1 * | 12/2009 | Shimizu et al. | 359/796 |

FOREIGN PATENT DOCUMENTS

| | | |
|---|---|---|
| CN | 101038348 | 9/2007 |
| JP | S63-217301 | 9/1988 |

(Continued)

OTHER PUBLICATIONS

International Search Report—PCT/JP2012/080597—Mar. 5, 2013.
(Continued)

*Primary Examiner* — Dawayne A Pinkney
(74) *Attorney, Agent, or Firm* — Young & Thompson

(57) ABSTRACT

In a composite molded lens, a press-formed lens body is integral with an injection-molded lens frame. The lens body has a lens portion and a flange portion surrounding the lens portion. Eight projections are radially formed on a top surface of the flange portion. The height of the projection increases toward an outer peripheral edge side of the flange portion. A recess is formed on an outer peripheral edge face of the flange portion and located at a position on a line extending from the projection. The recess increases torsional resilience of a joint surface between the lens body and the lens frame and strengthens bonding force there between.

2 Claims, 10 Drawing Sheets

(51) Int. Cl.
| | | |
|---|---|---|
| *C03B 11/08* | (2006.01) | |
| *B29C 43/02* | (2006.01) | |
| *B29C 69/02* | (2006.01) | |
| *B29C 45/14* | (2006.01) | |
| *G02B 3/00* | (2006.01) | |
| *B29L 11/00* | (2006.01) | |
| *B29K 101/12* | (2006.01) | |
| *B29L 12/00* | (2006.01) | |
| *B29L 31/00* | (2006.01) | |

(52) U.S. Cl.
CPC .......... *B29C 45/14336* (2013.01); *B29C 69/02* (2013.01); *C03B 11/08* (2013.01); *G02B 3/00* (2013.01); *G02B 7/022* (2013.01); *B29K 2101/12* (2013.01); *B29L 2011/0016* (2013.01); *B29L 2012/00* (2013.01); *B29L 2031/764* (2013.01); *C03B 2215/06* (2013.01); *C03B 2215/49* (2013.01); *C03B 2215/73* (2013.01); *C03B 2215/79* (2013.01)

(56) References Cited

FOREIGN PATENT DOCUMENTS

| JP | H07-98669 | 10/1995 |
| JP | 2002-006383 | 1/2002 |
| JP | 2007-022905 | 2/2007 |
| JP | 2011-090264 | 5/2011 |
| JP | 2012-073543 | 4/2012 |

OTHER PUBLICATIONS

Chinese Office Action, dated Feb. 13, 2015, in corresponding Chinese Patent Application No. 201280069984.8.

\* cited by examiner

COMPOSITE MOLDED LENS AND METHOD FOR PRODUCING THE SAME

CROSS-REFERENCE TO RELATED APPLICATIONS

This application is a Continuation of PCT International Application No. PCT/JP2012/080597 filed on Nov. 27, 2012, which claims priority under 35 U.S.C. §119 (a) to Japanese Patent Application No. 2012-051227, filed Mar. 8, 2012. Each of the above application(s) is hereby expressly incorporated by reference, in its entirety, into the present application.

BACKGROUND OF THE INVENTION

1. Field of the Invention

The present invention relates to a composite molded lens formed by press-forming and injection molding and a method for producing a composite molded lens.

2. Description Related to the Prior Art

A digital camera, a mobile terminal with a camera, or the like uses a taking lens to form an image of a subject on an image sensor. A projector uses a projector lens to project an image, which is displayed on a liquid crystal display, onto a screen. A molded lens is generally used as an optical lens such as the taking lens or the projector lens. The molded lens is produced by press-forming a preform (lens material) while the preform is heated.

The molded lens has advantages that it has high optical performance and eliminates the need for after-treatment such as grinding. However, it is difficult to form a positioning or alignment face, which is perpendicular to the optical axis, and an outer peripheral end face, which is fitted into a lens frame, of the molded lens. Hence, it is difficult to align the position of the molded lens in the lens frame or a lens barrel or to improve the accuracy of centering the molded lens. Recently, small molded lenses and large-diameter molded lenses have been developed and there has been a tendency to reduce the lens thickness relative to outer-diameter dimensions. In a case where the thickness of the molded lens, particularly, a convex lens, is further reduced, an outer peripheral portion thereof becomes extremely thin. This makes it difficult to attach the lens frame to the molded lens. As a result, the accuracy of attaching the lens frame or the like to the molded lens is further reduced.

For this reason, it is suggested to integrally form the lens frame around the outer periphery of the lens. For example, in Japanese Examined Patent Publication No. 07-98669, first and second molds are used to apply pressure to a lens material (preform) while the lens material is heated, and thereby an optical element (lens body) is produced. During the application of the pressure, an outer peripheral portion of the optical element is squeezed out of inner side portions of the first and second molds and projects into a cavity between the first and second molds. Molten resin is filled in the cavity to form an optical element frame (lens frame) by injection molding. Thereby the optical element frame is bonded to the outer peripheral portion of the optical element, and thus an optical element (composite molded lens) is formed integrally with the optical element frame.

Japanese Patent Laid-Open Publication No. 2007-22905 also discloses producing an optical element device (composite molded lens) by use of first and second molds. Glass is press-formed with the first and second molds while being heated, and thereby an optical lens (lens body) is produced. Then resin is injection-molded to form a frame (lens frame) integrally with the optical lens. Thus, the optical element device (composite molded lens) is produced. In this optical element device, a flat portion (flange portion) is formed around the outer periphery of the optical lens to prevent the resin from flowing onto the surface of the optical lens during the injection molding of the frame. The frame is tightly bonded to the outer peripheral end face of the flat portion.

In a case where the lens frame is injection-molded around the outer periphery of the press-formed lens body, the problem arises that the bonding performance (tight bonding performance) of a joint surface or interface between the outer periphery of the lens body and the lens frame is insufficient. The insufficient bonding performance may result in separation of the lens frame from the lens body due to difference in expansion, which is caused by a change in environment temperature, or a curve or twist at the time of attaching the optical element device to a lens barrel.

SUMMARY OF THE INVENTION

An object of the present invention is to provide a composite molded lens with excellent bonding performance of its joint surface and a method for producing a composite molded lens.

In order to achieve the above and other objects, the composite molded lens of the present invention comprises projections and/or grooves on at least one of surfaces of the flange portion. The projections and the grooves extend radially toward an outer peripheral edge. The composite molded lens comprises a press-formed lens body and an injection-molded lens frame. The lens body has a lens portion and a flange portion surrounding the lens portion. The lens frame is integral with the lens body such that the lens frame surrounds the flange portion. The height of the projection increases toward an outer peripheral edge side and the depth of the groove increases toward the outer peripheral edge side and thereby a recess or a protrusion is formed in a portion on an outer peripheral end face of the flange portion and located on a line extending from the projection or the groove.

It is preferable that the projections are formed on each of the surfaces of the flange portion such that positions of the projections on one of the surfaces coincide with positions of the projections on the other surface.

It is preferable that the projections are formed at a predetermined pitch on one of the surfaces of the flange portion and the grooves are formed at a predetermined pitch on the other surface of the flange portion and the projections are shifted from the grooves by ½ pitch so as not to overlap with each other.

The material of the lens body may be selected as necessary so long as the material can be press-formed. For example, the material of the lens body may be glass or resin. It is preferable that the lens frame is made from resin because the lens frame is formed by injection molding.

The method for producing a composite molded lens of the present invention has a preform placing step, a press-forming step, a projection or groove forming step, and a frame forming step. The lens body, which has the lens portion and the flange portion surrounding the lens portion, is press-formed and then the lens frame is injection-molded to surround the flange portion. Thereby the composite molded lens, in which the lens body and the lens frame are integral with each other, is produced. In the preform placing step, a preform, being a lens material, is placed between a pair of molds composed of a first mold and a second mold. In the press-forming step, the preform is pressed by making the first and second molds closer to each other until an outer peripheral portion of the preform projects into a cavity for forming the lens frame and thereby the lens body is formed. In the projection or groove forming step, projections and/or grooves are formed on at least one of surfaces of the flange portion while the lens body is press-formed. The projections and the grooves extend radially toward an outer peripheral edge. The height of the projection increases toward an outer peripheral edge side and the depth of the groove increases toward the outer peripheral edge side and thereby a recess or a protrusion is formed in a portion on an outer peripheral end face of the flange portion and located on a line extending from the projection or the groove. In the frame forming step, the lens frame is formed by injecting molten resin into the cavity for forming the lens frame, in a state that the first and second molds are closed completely.

According to the present invention, the projections and/or the grooves extending radially toward the outer peripheral edge are formed on the flange portion, which surrounds the lens body. Thereby, the lens body and the lens frame are tightly bonded to each other. The bonding performance between the lens body and the lens frame is excellent.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
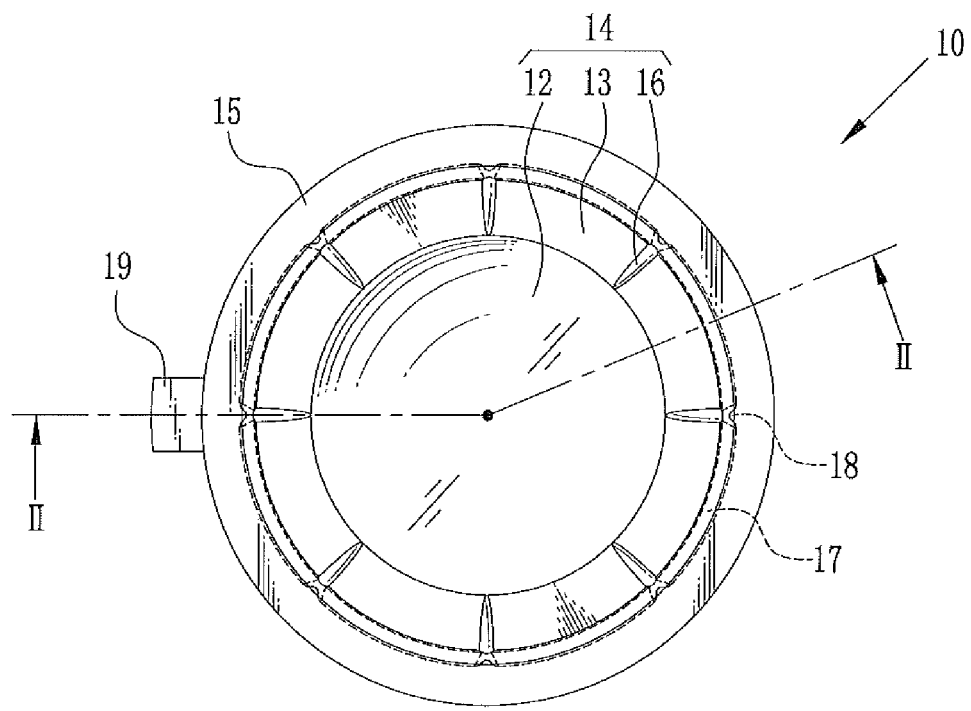
FIG. 1 is a plan view illustrating a composite molded lens according to a first embodiment of the present invention.
Figure 2:
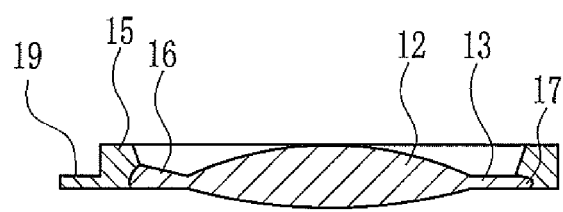
FIG. 2 is a cross-sectional view cut along a line II-II in FIG. 1.

In FIGS. 1 and 2, a composite molded lens 10 comprises a lens body 14 and a lens frame (frame) 15. The lens body 14 is made by press-forming or press-molding a transparent preform. The lens frame 15 is made by injection molding. The lens body 14 has a lens portion 12 and a flange portion 13 surrounding the lens portion 12. The lens frame 15 is made from resin such as PMMA or PC through injection molding. The lens frame 15 is tightly joined to an outer peripheral portion of the flange portion 13. Note that opaque resin is commonly used for the lens frame 15. A gate portion 19 is formed due to the injection molding. The gate portion 19 is removed later as necessary.

Figure 3:
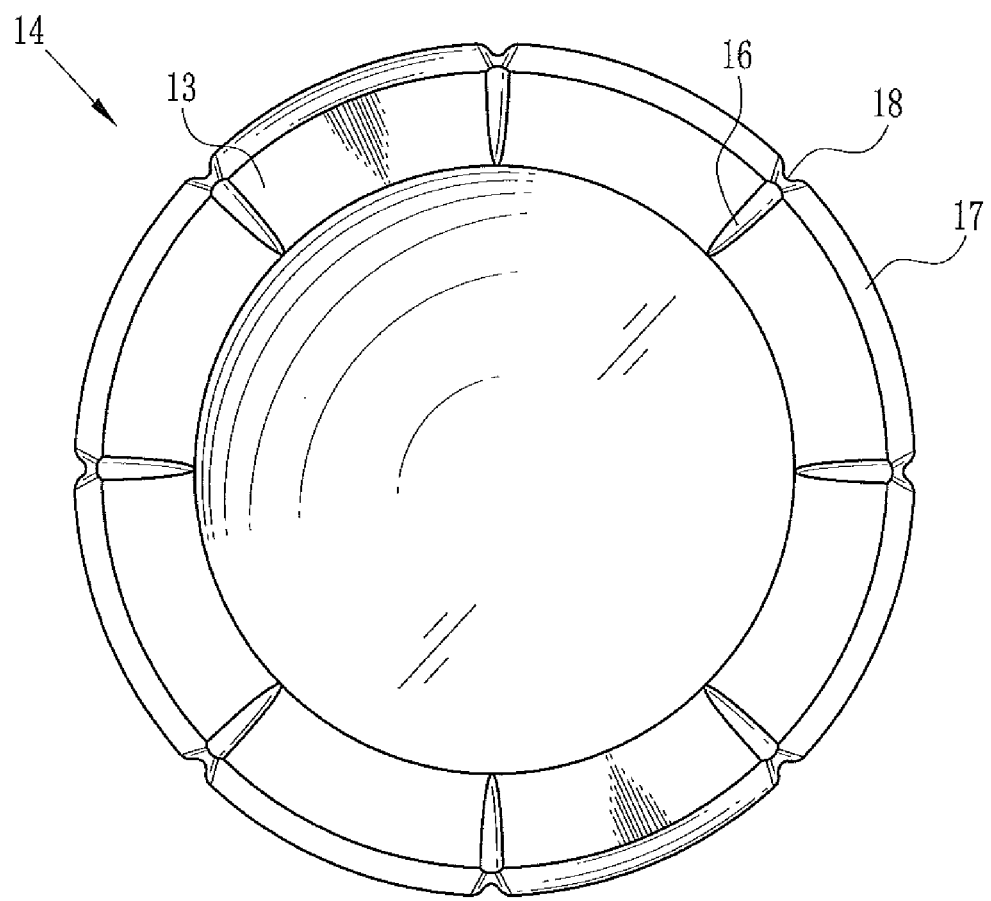
FIG. 3 is a plan view of a press-formed lens body.
Figure 4:
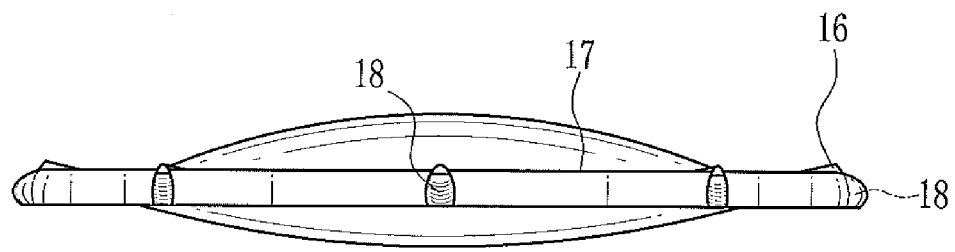
FIG. 4 is a side view of the lens body.

In FIGS. 3 and 4, there are eight projections 16 extending radially at 45° intervals on one surface of the flange portion 13 of the lens body 14. A planar shape of the projection 16 has a flat semi-ellipsoidal shape. A cross-section of the projection 16 has an upper convex segmental shape or a semi-ellipsoidal shape. The height of the projection 16 increases in a direction from a center side of the flange portion 13 to an outer peripheral edge side of the flange portion 13. The flange portion 13 is pressed until an outer peripheral portion 17 projects into a frame forming cavity 25 (see FIG. 5). The outer peripheral portion 17 projected into the frame forming cavity 25 becomes a joint surface or interface between the flange portion 13 and the lens frame 15. An outline of the outer peripheral portion 17 has a substantially circular shape when viewed from the top. A recess 18 is formed at a position on a line extending from the projection 16.

As shown in FIG. 4, when viewed from the side, an end face (hereinafter may referred to as the outer peripheral end face) of the outer peripheral portion 17 is a free curved surface which has been squeezed out and projected. The recess 18 is formed due to relatively weak pressing force acting on a position on the line extending from the projection 16, as compared with the pressing force acting on other positions. Note that the shape of the recess 18 varies depending on the material (hardness) of a preform 11 or the amount of the outer peripheral portion 17 projected.

Figure 5:
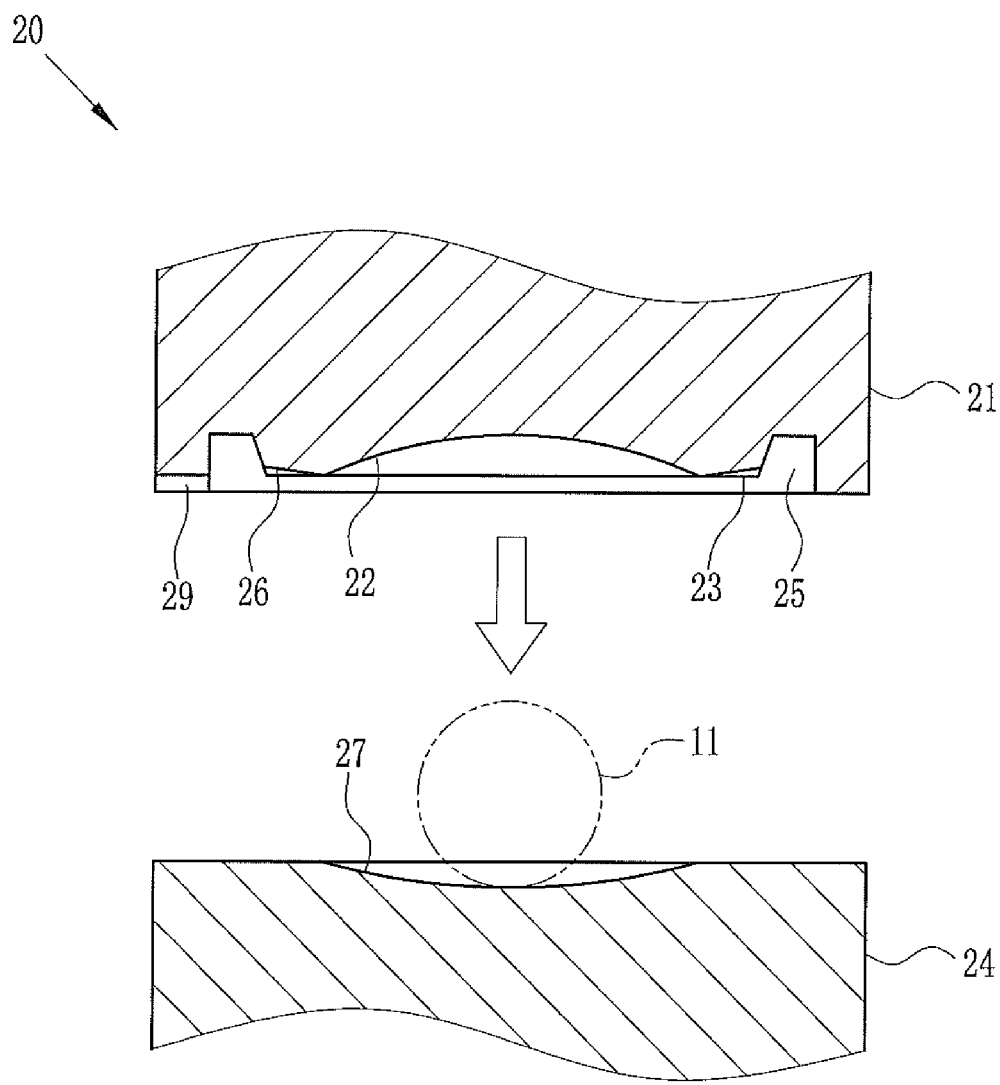
FIG. 5 is a cross-sectional view of a mold.
Figure 6:
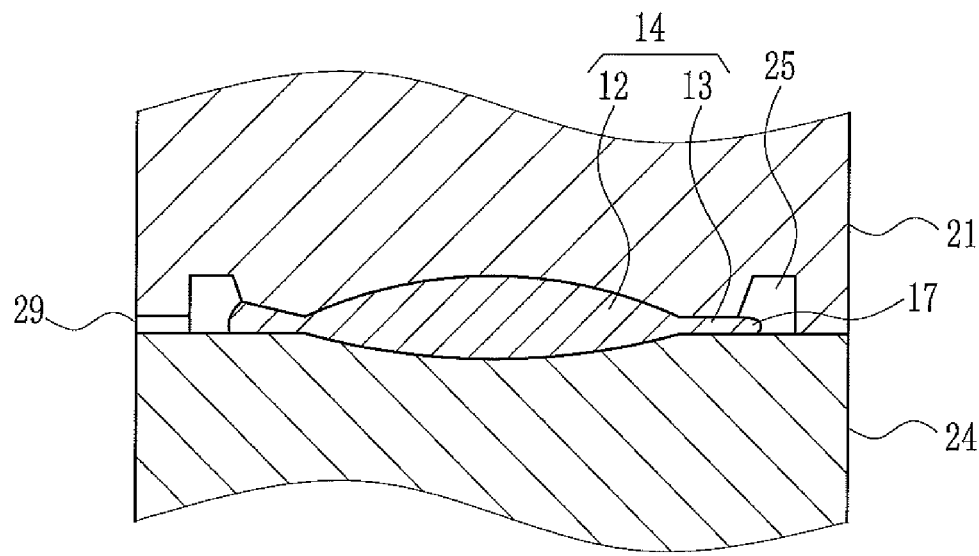
FIG. 6 is a cross-sectional view of the mold during the press-forming.
Figure 7:
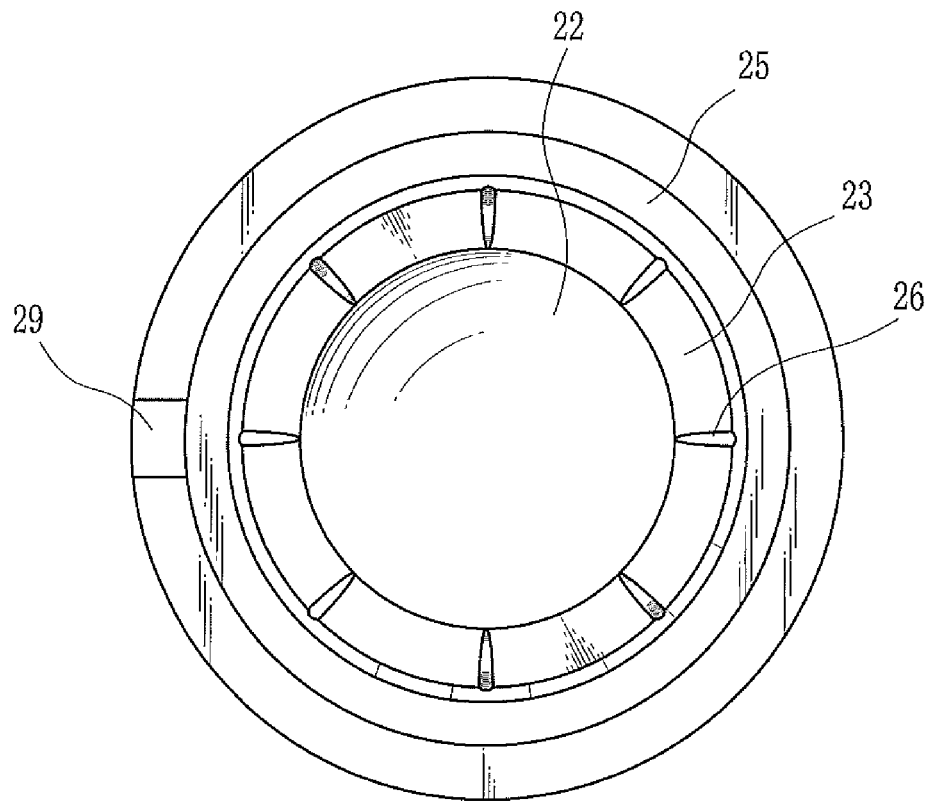
FIG. 7 is a bottom view of a first mold.

As shown in FIGS. 5-7, a mold 20 for a composite molded lens is composed of a pair of first mold 21 and second mold 24. Each of the first mold 21 and the second mold 24 incorporates a heater (not shown) for heating and softening the preform 11. The first mold 21 has a transfer surface 22 for forming an optical surface of the lens portion 12, a flange forming surface 23 for forming the flange portion 13, and the frame forming cavity 25. The transfer surface 22, the flange forming surface 23, and the frame forming cavity 25 are concentric with each other. Agate opening 29, from which optical resin for forming the lens frame 15 is injected, is provided on the outer peripheral side of the frame forming cavity 25. The flange forming surface 23 is formed with eight depressed portions 26 each extending to the frame forming cavity 25. The depth of the depressed portion 26 increases toward the outer peripheral edge. The cross-section of the depressed portion 26 has a curved shape approximated to a part of an ellipsoid. The second mold 24 is formed with a transfer surface 27 for forming the other optical surface of the lens portion 12. Note that, in a case where grooves are formed on the flange portion 13, projected portions are provided, instead of the depressed portions 26, on the flange forming surface 23.

Next, a method for producing the composite molded lens 10 is described. As shown in FIG. 5, the preform 11 is placed on the second mold 24. The preform 11 is pressed between the first and second molds 21 and 24 by making the first and the second molds 21 and 24 closer to each other. At this time, the preform 11 is heated with the heaters, which are incorporated in the respective first and second molds 21 and 24, and softened. As shown in FIG. 6, the preform 11 is pressed until the outer peripheral portion of the preform 11 is projected into the frame forming cavity 25. Thus the lens body 14 is produced by press-forming. The projections 16, with the height increasing toward the outer peripheral edge side, are formed radially on the flange portion 13 of the lens body 14. The recesses 18 are formed on an outer peripheral end face of the outer peripheral portion 17. The positions of the recesses 18 correspond to those of the projections 16. The recess 18 is concave in the direction of a radius of the lens body 14.

The preform 11 is formed into the lens body 14 when the first mold 21 and the second mold 24 are completely and tightly in contact with each other. Thereby the press-forming is completed.

Then, the resin is filled into the mold 20 from the gate opening 29, with the first and second molds 21 and 24 kept tightly in contact with each other. Thereby the lens frame 15 is made by the injection molding and thus the composite molded lens 10 is produced. Thereafter, the first and second molds 21 and 24 are separated from each other and the composite molded lens 10 is taken out of the second mold 24.

In the composite molded lens 10 thus produced, the outer peripheral portion 17 of the flange portion 13 is the joint surface or the interface between the lens body 14 and the lens frame 15. The outer peripheral end face of the outer peripheral portion 17 is not a simple free curve surface, but formed with the recesses 18, each recessed by an amount which corresponds to the pressing force released by the depressed portion 26 of the first mold 21. The recesses 18 are formed in eight places on the free curved surface in this example. The recesses 18 improve torsional resilience of the joint surface and comprehensively strengthens bonding force (tight bonding force) of the lens frame 15 to the lens body 14. The strength of the flange portion 13 is also improved by the projections 16.

Second Embodiment

Figure 8:
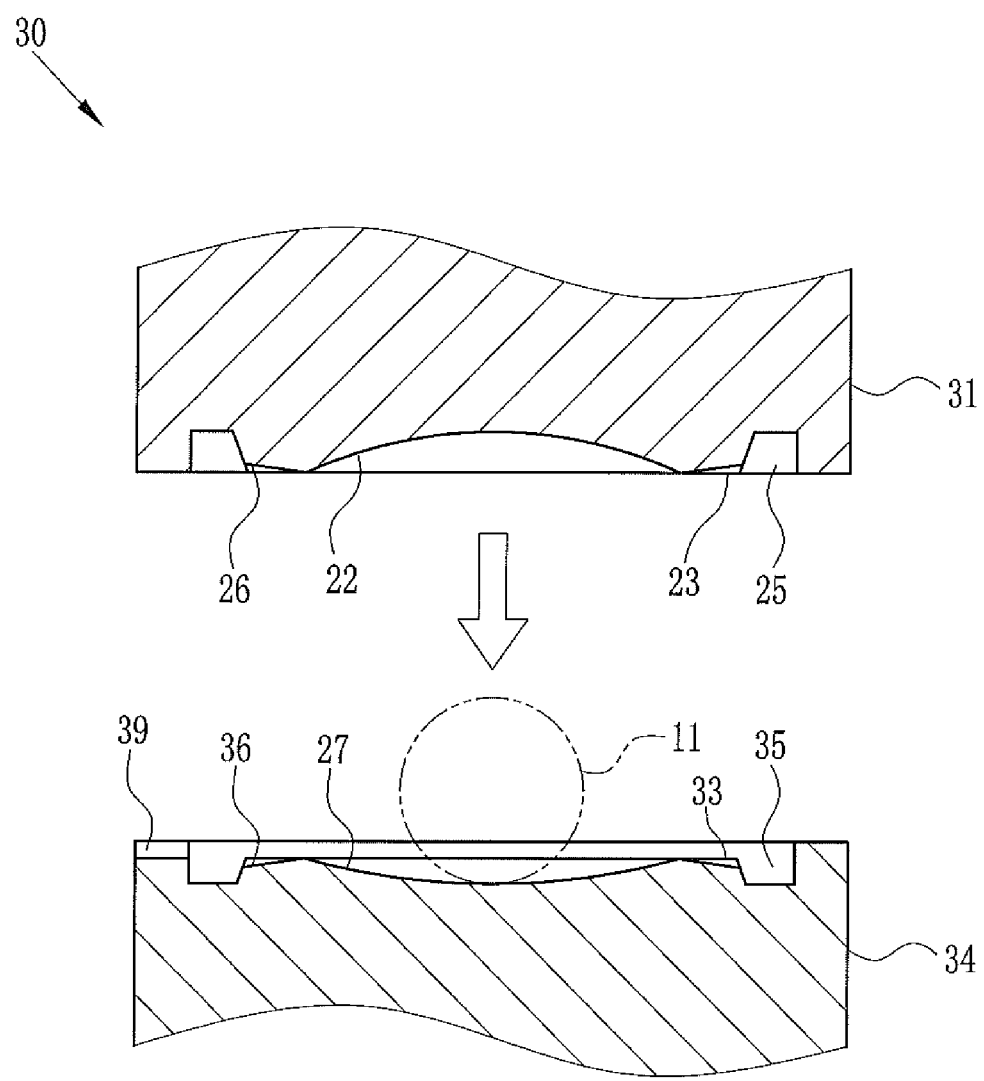
FIG. 8 is a cross-sectional view illustrating a mold for forming a composite molded lens according to a second embodiment.
Figure 9:
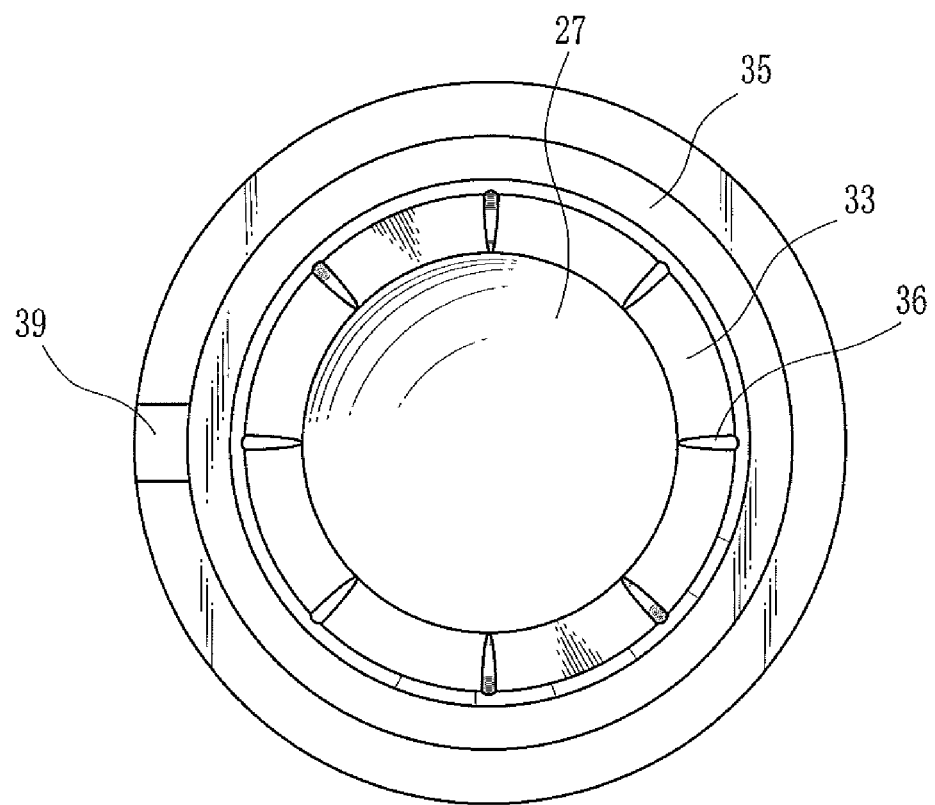
FIG. 9 is a plan view of a second mold.
Figure 10:
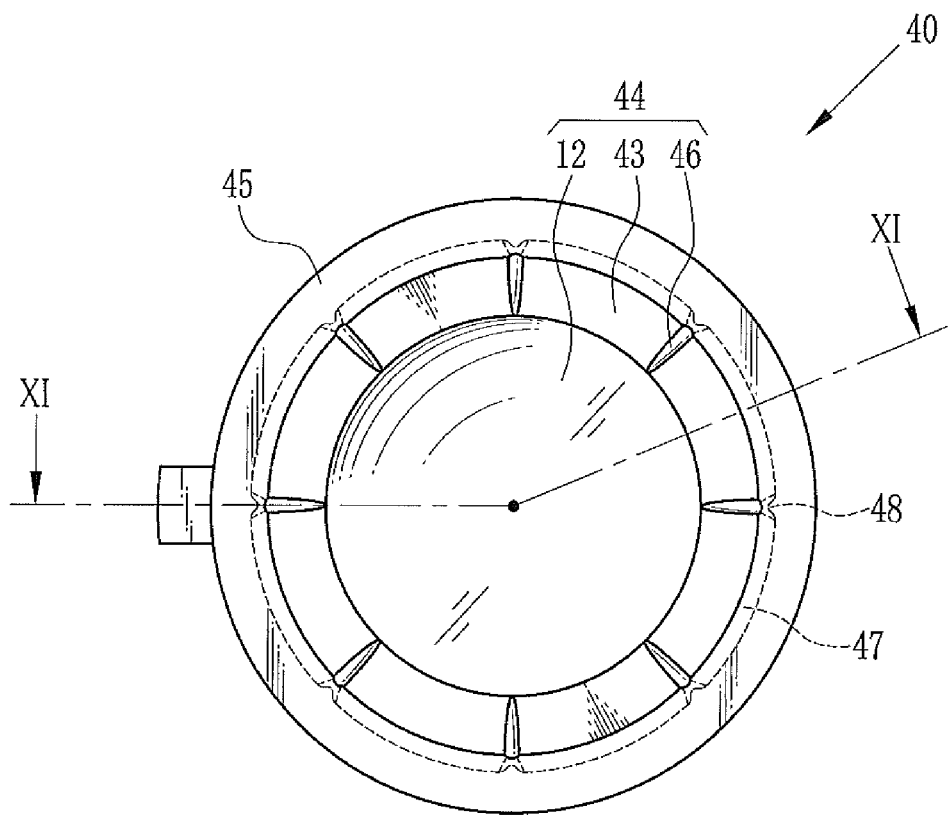
FIG. 10 is a rear view of composite molded lens according to the second embodiment.

In a second embodiment shown in FIGS. 8 to 12, the projections are formed on each surface of the flange portion. The positions of the projections on the top surface correspond to or coincide with those of the projections on the bottom surface. Note that the same reference numbers are used for the same parts as in the first embodiment. In FIGS. 8 and 9, a mold 30 is composed of a first mold 31 and a second mold 34. A gate opening 39 is formed in the second mold 34. The first mold 31 is the same as the first mold 21 of the first embodiment except that the lower edge of the first mold 31 is cut away by the thickness of the gate opening 39. The first mold 31 is formed with the transfer surface 22, the flange forming surface 23, the frame forming cavity 25, and the eight depressed portions 26. As shown in FIG. 9, the shape of the second mold 34 is the same as that of the first mold 21 of the first embodiment. The second mold 34 is formed with the transfer surface 27, a flange forming surface 33, a frame forming cavity 35, and eight depressed portions 36. A composite molded lens 40 shown in FIG. 10 is formed with the mold 30.

Figure 11:
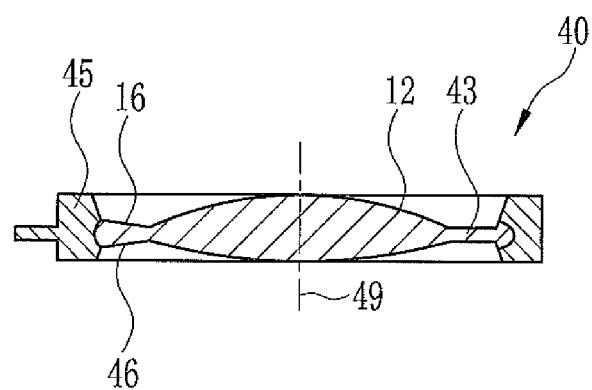
FIG. 11 is a cross-sectional view cut along a line XI-XI in FIG. 10.
Figure 12:
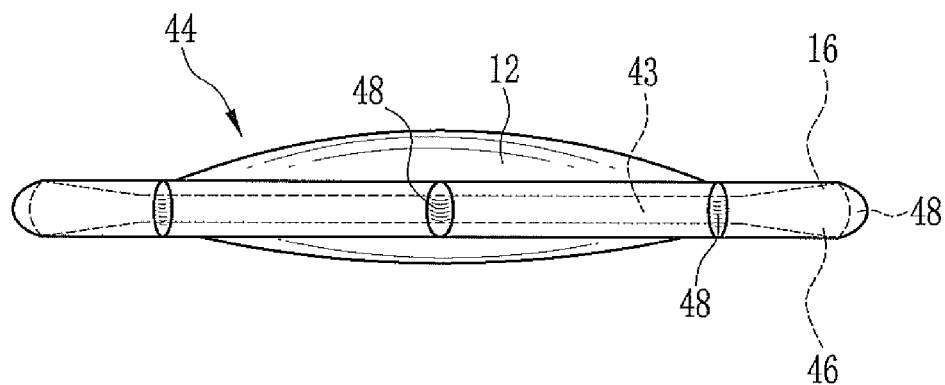
FIG. 12 is a side view of a lens body of the composite molded lens shown in FIG. 10.

As shown in FIGS. 10 to 12, the composite molded lens 40 has a lens body 44 and a lens frame 45. The lens body 44 has the lens portion 12 and a flange portion 43. The eight projections 16 are formed radially at regular intervals on the top surface of the flange portion 43. Eight projections 46 are formed radially on the bottom surface of the flange portion 43 such that the positions of the projections 46 correspond to or coincide with the positions of the projections 16 on the top surface of the flange portion 43. Due to the projections 16 and 46, recesses 48 are formed at a regular pitch on an outer peripheral end face of an outer peripheral portion 47 of the flange portion 43.

The recesses 48 prevent the separation of the lens frame 45 due to rotational force about an optical axis 49, in a manner similar to the first embodiment. The outer peripheral portion 47 is embedded in the lens frame 45 and thereby the separation of the lens frame 45 due to action force in the direction of the optical axis 49 is prevented, in a manner similar to the first embodiment. As a result, the bonding performance of the lens frame 45 to the lens body 44 is improved.

Third Embodiment

Figure 13:
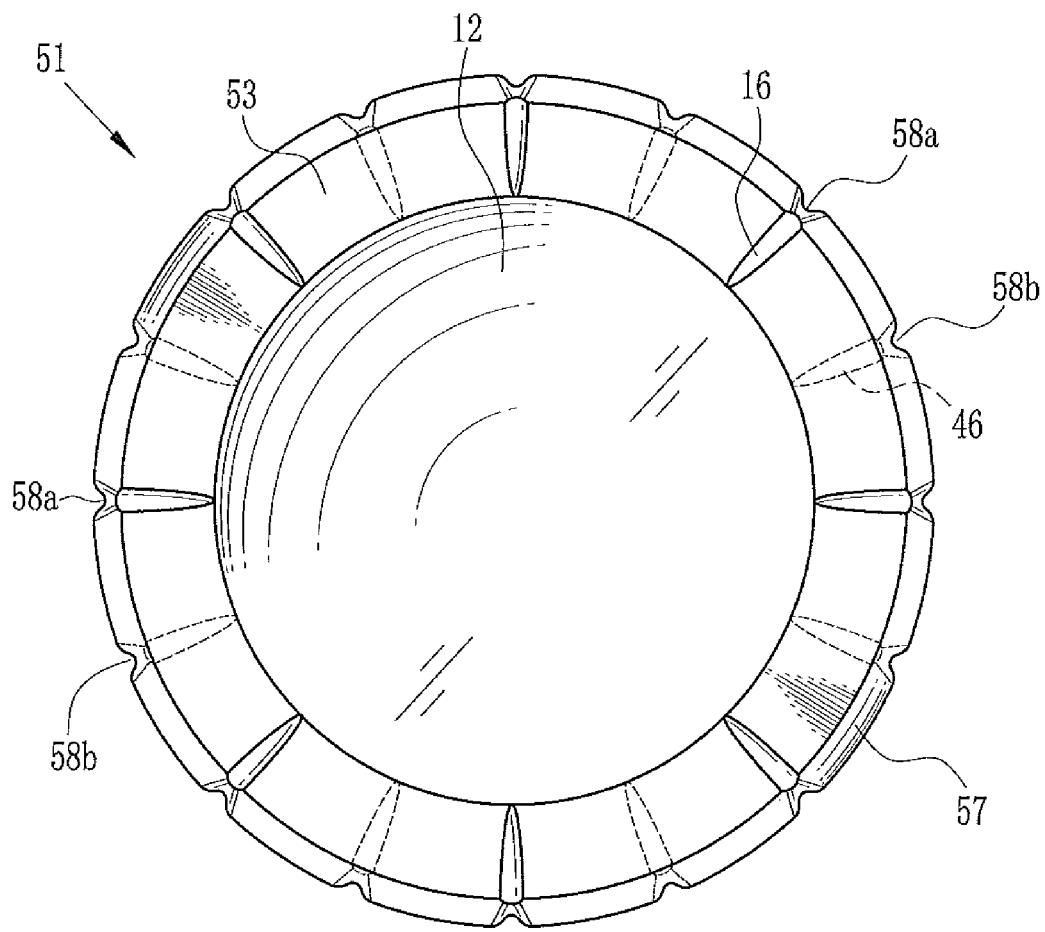
FIG. 13 is a plan view of a lens body according to a third embodiment.
Figure 14:
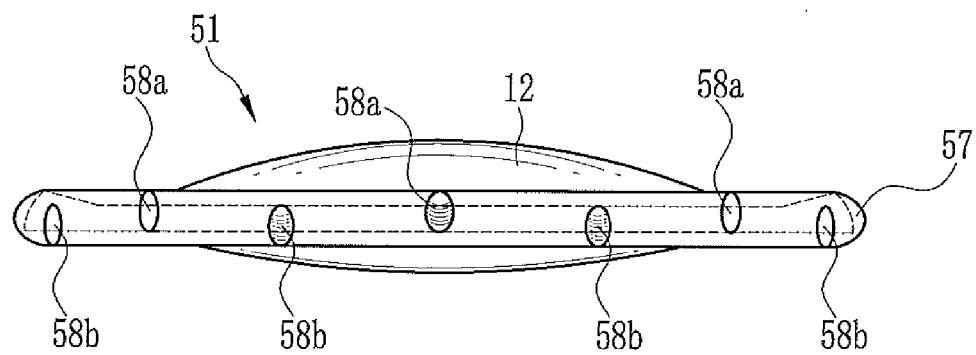
FIG. 14 is a side view of the lens body according to the third embodiment.

In a third embodiment shown in FIGS. 13 and 14, the projections 16 on the top surface of a flange portion 53 of a lens body 51 are shifted by ½ pitch (rotated by 22.5°) from the projections 46 on the bottom surface thereof. Thereby recesses 58a and 58b are formed alternately on the outer peripheral end face of an outer peripheral portion 57 of the flange portion 53. The recesses 58a and 58b are staggered from each other in an up-and-down direction. The recesses 58a and 58b make the free curved shape of the outer peripheral end face complex. As a result, the bonding force of the lens frame to the lens body 51 is further strengthened. Note that only the lens body 51 is depicted in FIGS. 13 and 14 because the lens frame is apparent from FIGS. 1 and 2.

Fourth Embodiment

Figure 15:
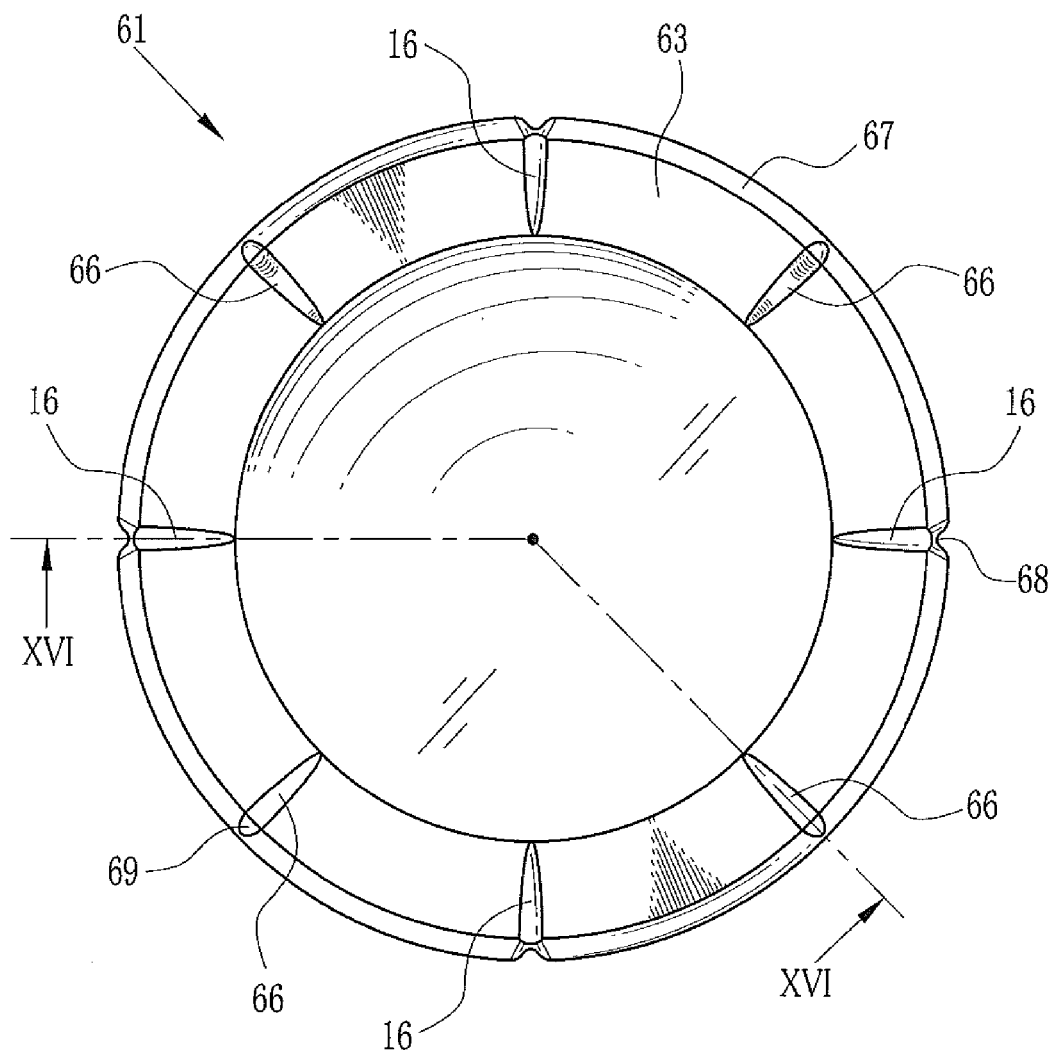
FIG. 15 is a plan view of a lens body according to a fourth embodiment.
Figure 16:
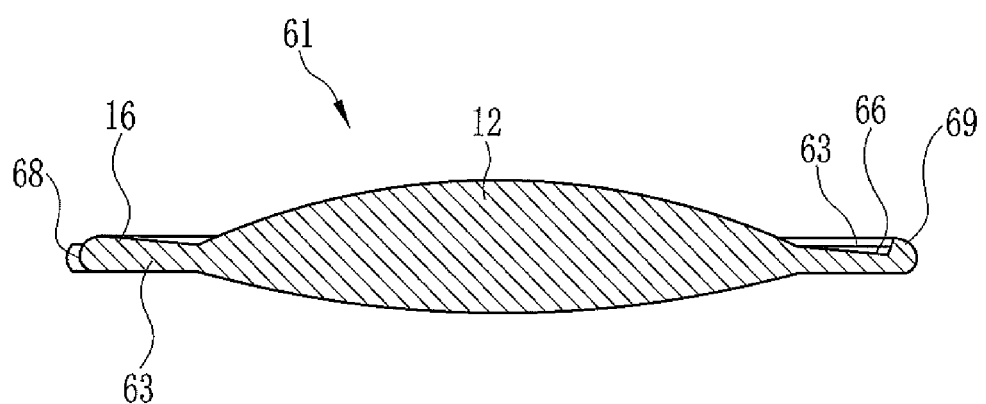
FIG. 16 is a cross-sectional view cut along a line XVI-XVI in FIG. 15.
Figure 17:
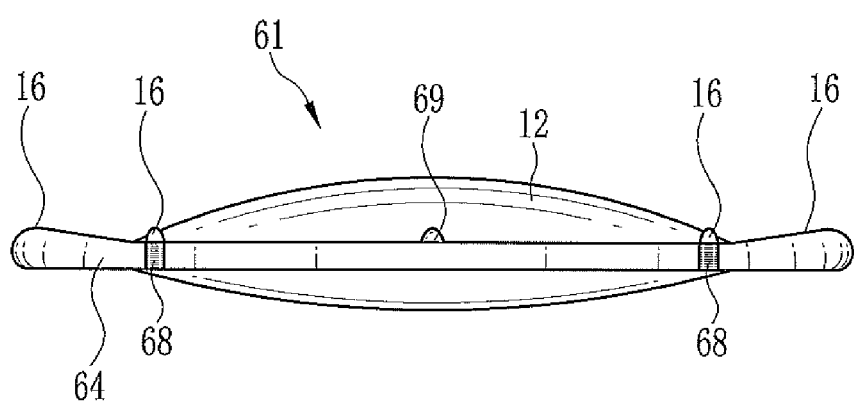
FIG. 17 is a side view of the lens body according to the fourth embodiment.

In a fourth embodiment shown in FIGS. 15 to 17, the four projections 16 and four grooves 66 are formed alternately at 45° intervals on a top surface of a flange portion 63 of a lens body 61. Thereby recesses 68 are formed on an outer peripheral portion 67 projected. The recess 68 is formed at a position on a line extending from the projection 16. A protrusion 69 is formed at a position on a line extending from the groove 66. The shapes and dimensions of the recess 68 and the protrusion 69 vary depending on the viscosity of the preform 11 and an amount of the preform 11 projected into the frame forming cavity. A deformed region such as the recess 68 or the protrusion 69 may not extend to the outer peripheral edge of the outer peripheral portion 67. In this case, the plan shape or outline of the outer peripheral edge of the flange portion is circular without unevenness.

The number of the projections 16 and the number of the grooves 66 are not limited to four and may be determined as necessary. The projections 16 and the grooves 66 may be formed on each surface of the flange portion 63. In this case, the positions of the projections 16 and the grooves 66 on one surface may differ or be slightly shifted from those of the projections 16 and the grooves 66 on the other surface. Thereby the shape of the recess or the free curved surface formed on the outer peripheral portion 67 becomes more complex. As a result, the bonding force between the lens body and the lens frame is further strengthened.

One of the surfaces of the flange portion may be formed with grooves. One surface of the flange portion may be formed with projections and the opposite surface may be formed with grooves. The cross-section of the projection or the groove may have a curved shape, such as the shape of a segment or a semi-ellipsoid, or a triangular shape, a rectangular shape, or the like so long as the shape is suitable for press-forming.

In each embodiment, the lens body has the convex surfaces. The shapes of the lens surfaces are not limited to them. For example, a meniscus lens may be used. The material (for example, glass or transparent plastic) of the lens body may be selected as necessary in accordance with the purpose and the usage.

The composite molded lens of the present invention is used in an imaging module of a digital camera. The composite molded lens of the present invention may be used in an imaging module of a mobile terminal device such as a mobile phone or a smart phone, a mobile game machine, or a PDA (Personal Digital Assistant).

Various changes and modifications are possible in the present invention and may be understood to be within the present invention.

What is claimed is:

1. A method for producing a composite molded lens, the composite molded lens comprising a press-formed lens body and an injection-molded lens frame, the lens body having a lens portion and a flange portion surrounding the lens portion, the lens frame having an annular shape surrounding the flange portion and being integral with the lens body through the flange portion, the method comprising the steps of:

placing a preform, being a lens material, between a first mold and a second mold;

pressing the preform between the first and second molds until an outer peripheral portion of the preform projects into a cavity for forming the lens frame and thereby press-forming the lens body with an outer peripheral edge of the flange portion in the cavity;

forming at least one of projections and grooves on the flange portion while press-forming the lens body, the projections and the grooves extending radially toward the outer peripheral edge of the flange portion, a height of the projection increasing toward the outer peripheral edge and a depth of the groove increasing toward the outer peripheral edge so that a recess or a protrusion is formed in an end face of the outer peripheral edge of the flange portion on a line extending from the projection or the groove; and forming the lens frame into the annular shape surrounding the flange portion and into contact with the outer peripheral edge of the flange portion in the cavity by injecting molten resin into the cavity for forming the lens frame without opening the first and second molds, wherein the projections are formed at a predetermined pitch on opposing surfaces of the flange portion so that the projections on one of the opposing surfaces coincide with projections on the other of the opposing surfaces.

2. A method for producing a composite molded lens, the composite molded lens comprising a press-formed lens body and an injection-molded lens frame, the lens body having a lens portion and a flange portion surrounding the lens portion, the lens frame having an annular shape surrounding the flange portion and being integral with the lens body through the flange portion, the method comprising the steps of:

placing a preform, being a lens material, between a first mold and a second mold;

pressing the preform between the first and second molds until an outer peripheral portion of the preform projects into a cavity for forming the lens frame and thereby press-forming the lens body with an outer peripheral edge of the flange portion in the cavity;

forming at least one of projections and grooves on the flange portion while press-forming the lens body, the projections and the grooves extending radially toward the outer peripheral edge of the flange portion, a height of the projection increasing toward the outer peripheral edge and a depth of the groove increasing toward the outer peripheral edge so that a recess or a protrusion is formed in an end face of the outer peripheral edge of the flange portion on a line extending from the projection or the groove; and forming the lens frame into the annular shape surrounding the flange portion and into contact with the outer peripheral edge of the flange portion in the cavity by injecting molten resin into the cavity for forming the lens frame without opening the first and second molds, wherein the projections are formed at a predetermined pitch on one of opposing surfaces of the flange portion and the grooves are formed at a predetermined pitch on the other of the opposing surfaces of the flange portion and the projections are shifted from the grooves by ½ pitch so as not to overlap with each other.

* * * * *